(12) United States Patent
Schneider

(10) Patent No.: US 6,516,522 B2
(45) Date of Patent: Feb. 11, 2003

(54) IMPLEMENT HAVING A DRIVE MOTOR AND A SUPPORTING DEVICE

(75) Inventor: Andreas Schneider, Weinstadt (DE)

(73) Assignee: Andreas Stihl AG & Co. (DE)

( * ) Notice: Subject to any disclaimer, the term of this patent is extended or adjusted under 35 U.S.C. 154(b) by 162 days.

(21) Appl. No.: 09/772,513

(22) Filed: Jan. 29, 2001

(65) Prior Publication Data

US 2001/0010124 A1 Aug. 2, 2001

(30) Foreign Application Priority Data

Jan. 29, 2000 (DE) .......................... 100 03 984

(51) Int. Cl.$^7$ .................. B26B 15/00; A01G 3/053
(52) U.S. Cl. .................. 30/298; 30/216; 30/296.01
(58) Field of Search .................. 30/296.1, 298, 30/295, 276, 216

(56) References Cited

U.S. PATENT DOCUMENTS

| | | | | |
|---|---|---|---|---|
| 4,179,805 A | * | 12/1979 | Yamada | 30/296.1 |
| 5,265,341 A | * | 11/1993 | Kikuchi | 30/296.1 |
| 6,182,367 B1 | * | 2/2001 | Janczak | 30/392 |

* cited by examiner

*Primary Examiner*—Hwei-Siu Payer
(74) *Attorney, Agent, or Firm*—R W Becker & Associates; R. W. Becker

(57) ABSTRACT

An implement is provided and has a drive motor secured to one end of a carrying tube and connected via a drive shaft in the tube with the other end of the tube. A first handle is disposed on the tube in the vicinity of the drive motor and is spaced from a second handle. To support the forearm of an operator, a supporting device is provided that extends in the longitudinal direction of the carrying tube in the direction toward the drive motor. The longitudinal axis of the supporting device forms an angle of less than 90° with the carrying tube and is open toward the drive motor.

17 Claims, 3 Drawing Sheets

IMPLEMENT HAVING A DRIVE MOTOR AND A SUPPORTING DEVICE

BACKGROUND OF THE INVENTION

The present invention relates to an implement having a drive motor that is secured to one end of a carrying tube and is connected via a drive shaft supported in the carrying tube with a cutting tool that is disposed at the other end of the carrying tube; the implement has a first handle disposed in the vicinity of the drive motor and extending in the longitudinal direction of the carrying tube, and a second handle that is disposed substantially transverse to the carrying tube and is secured on the carrying tube between the first handle and the cutting tool.

Such implements, also known as brushcutters or scrub cutters, have a central component in the form of a carrying tube. The drive motor is disposed on one end of the carrying tube, and a cutter head is disposed on the other end of the carrying tube and has a miter gear that is driven by a drive shaft that is mounted in the carrying tube. The cutting tool that is secured to the cutter head is thus driven by the drive motor. The operating elements, such as gas throttle, starter lever, and the like, are provided in a handle that is coaxially mounted adjacent to the drive motor. A second handle that is disposed transverse to the carrying tube is fixed in position on the carrying tube between the first handle and the cutter head. The second handle can be embodied as a closed round handle. A shoulder strap for carrying the brushcutter by an operator can additionally be suspended between the first and second handles. In an operating position where the brushcutter is held close to the ground, such as for mowing grass or thinning growth, the brushcutter is guided in a position where it is inclined relative to the ground. In so doing, however, depending on the size of the implement and the operating position, the arms of the operator are often disposed at an angle, which is very fatiguing, especially with heavy implements. During operation, the user must also be sure to maintain an adequate safety distance relative to the housing of the drive motor, which hinders handling of the implement.

It is therefore an object of the present invention to improve an implement of the aforementioned general type in such a way as to provide better handling, especially when working close to the ground with heavy tools of the implement, and to also make it possible to operate with less fatigue.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
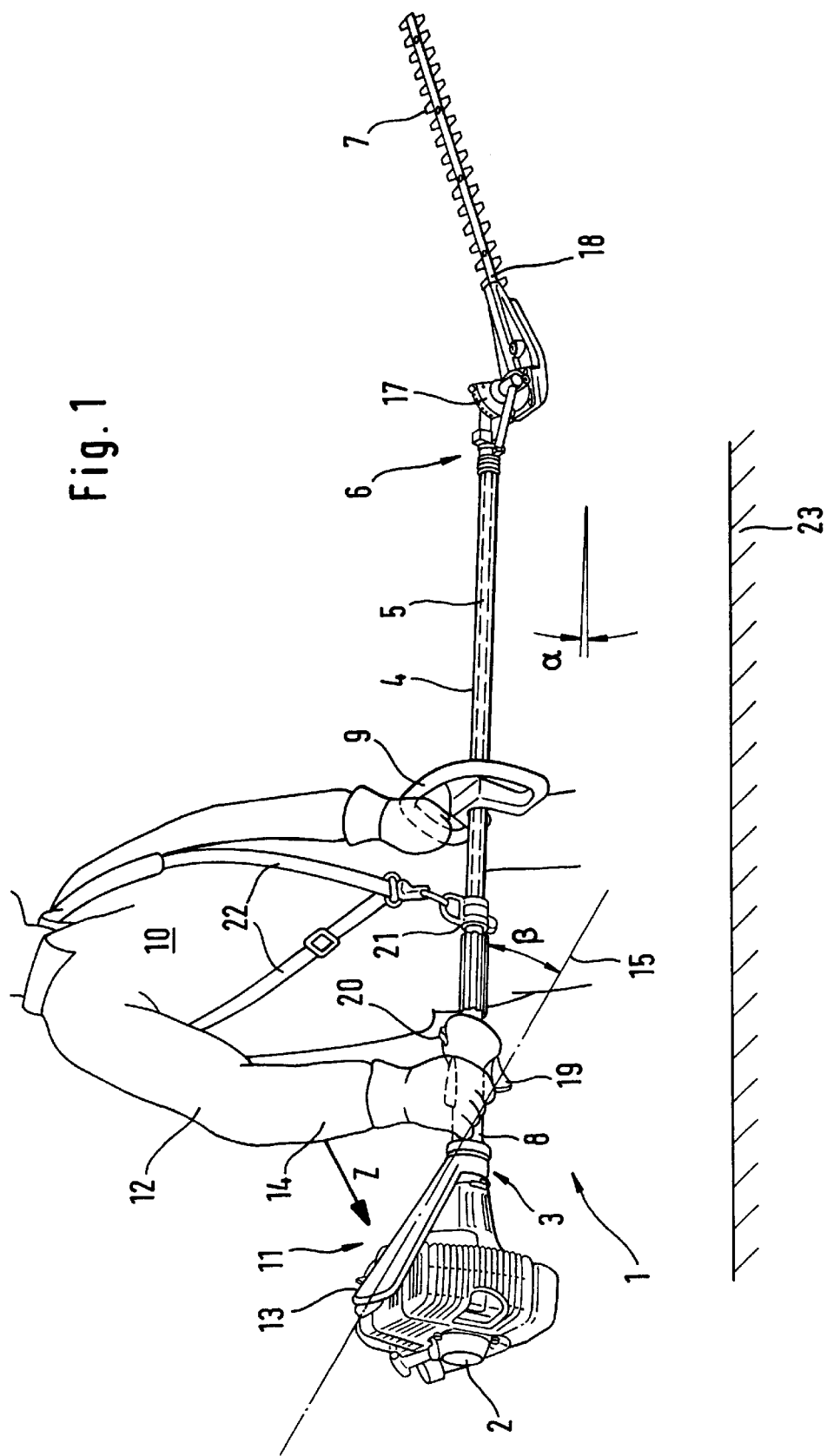
FIG. 1 is a perspective view of one exemplary embodiment of the inventive implement having a supporting device.

The implement of the present invention is characterized primarily by a supporting device that is disposed adjacent to the first handle for supporting an arm of an operator; the supporting device is provided with a supporting surface and extends in the longitudinal direction of the carrying tube at least partially in the space between the first handle and the drive motor, with the longitudinal axis of the supporting device forming an angle of about 35° or less with the supporting tube, wherein such angle is open toward the drive motor.

With the inventive implement, guide forces can be introduced by an operator at three points. The first handle is grasped by one hand of the operator, whereby control elements, such as gas throttle or on/off switch, can also be activated. The first handle is disposed on the carrying tube of the implement in the vicinity of the drive motor. The second handle, which is embodied, for example, as a U-shaped member that extends transverse to the carrying tube, is mounted on the carrying tube and is spaced from the first handle, and is used by the other hand of the operator for carrying and guiding the tool of the implement. The supporting device of the implement provides the operator with the possibility of applying additional guide forces with the forearm of the first hand, thereby providing relief for the second arm. This leads to an improved force distribution and allows the implement to be operated with far less fatigue. Since the supporting device extends in a direction toward the drive motor, it is disposed between the arm of the user and the motor housing, and thus also serves as protection against contact. Injuries from edges or hot surfaces can thus be avoided in addition to safety regulations.

The supporting device expediently extends at an angle relative to the carrying tube, so that in particular in the preferred operating position there is ensured that the forearm of an operator rests against the supporting surface. To adjust an ergonomically favorable angle of inclination relative to the carrying tube, the supporting device is adjustable. The supporting device expediently extends at least partially over the drive motor, and in particular extends over the entire drive motor.

The supporting device can be fastened at the first handle of the implement, on the carrying tube thereof, or on the housing, especially the clutch housing, of the drive motor. The supporting device is advantageously fixed in position by means of a clamping ring, which ensures an adjustment possibility relative to the longitudinal axis of the brushcutter.

In order to obtain a large-surface support, the supporting surface for the forearm of the operator on the supporting device has a trough-shaped or recessed configuration, advantageously with a concave cross-section. In so doing, the overall cross-sectional configuration of the supporting device can be embodied as an essentially U-shaped component having legs, in order in this way to ensure a high resistance to bending. It can be ergonomically expedient to curve the supporting surface of the supporting device in a direction of its longitudinal axis. The supporting surface can be padded and provided with rounded edges in order to ensure an operation that is comfortable and relatively free of fatigue.

The inventive supporting device is advantageously comprised of a heat resistant, fiber reinforced polymeric material, and is provided as an accessory for an implement such as a brushcutter, a bar or pole mower, a branch remover or pruner, or the like.

Further specific features of the present invention will be described in detail subsequently.

DESCRIPTION OF PREFERRED EMBODIMENTS

Referring now to the drawings in detail, FIG. 1 show as an implement a brushcutter 1 having a drive motor 2 and a cutting tool 7, for example a cutter bar 18, which are disposed at opposite ends 3 and 6 of a carrying or supporting tube 4. Mounted in the supporting tube 4 is a drive shaft 5 which at one end is driven by the drive motor 2, and at the other end is connected with a gear mechanism 17 that is disposed in a cutter head. In the illustrated embodiment, the gear mechanism 17 is a miter gear and transmits the rotating movement of the drive shaft 5 to a translatory drive for the cutter blades that are held on the guide bar of the cutter bar. It can be expedient, instead of the miter gear, to provide the carrying tube 4 with a bent shaft in which is mounted a flexible shaft. Located at about half of the length of the carrying tube 4, between the drive motor 2 and the cutting tool 7, is a second handle 9 as a U-shaped grip that extends transverse to the carrying tube 4. Disposed adjacent to the drive motor 2 on the carrying tube 4 is a first handle 8, which has a cylindrical main body and accommodates control elements such as a gas throttle 19, a short-circuiting switch 20, and the like. The first handle 8 is disposed coaxial to the carrying tube 4 and surrounds it.

Disposed between the first handle 8 and the second handle 9 is a fastening ring 21 for securing shoulder straps 22 to the carrying tube 4. The shoulder straps 22 serve for transferring the weight of the brushcutter 1 to an operator 10. Thus, the entire brushcutter 1, with its cutting tool 7, is mounted and held on the fastening ring 21 and the shoulder straps 22 in a swinging manner.

To guide the implement 1, the operator 10 essentially has to overcome the inertia of the brushcutter, especially when lifting the brushcutter 1 and raising the cutting tool 7 from the ground 23. For this movement process, it is helpful to apply an additional supporting force Z upon the brushcutter 1 with the forearm 14 of the arm 12 of the operator 10. To introduce the supporting force Z into the brushcutter 1, a supporting device 11 having a supporting surface 13 is provided; in the illustrated embodiment, the supporting device is provided between the first handle 8 and the drive motor 2. The supporting device 11, which is embodied as an arm support, advantageously extends at least partially, and in particular entirely, over the housing of the drive motor 2 of the brushcutter 1. The supporting device 11 at the same time serves as protection against contacting the motor housing, and can thus additionally protect from injury.

In the embodiment illustrated in FIG. 1, the supporting device 11 is secured to the carrying tube 4 between the drive motor 2 and the handle 8, for example by means of an adjustable clamping ring. The longitudinal axis 15 of the supporting surface 13 forms an acute angle β with the carrying tube of approximately 35°, especially 30°, which is open toward the drive motor 2.

In the operating position of the brushcutter 1, the latter, with its carrying tube 4, is inclined relative to the ground 23 at an angle α which is considerably greater than the angle α shown in FIG. 1. The forearm 14 of the operator 10 then rests against the supporting surface 13 of the supporting device 11. It is thereby easily possible to introduce a supporting force Z, which for example lifts the brushcutter, onto the supporting surface 13 by means of the forearm 14.

Figure 2:
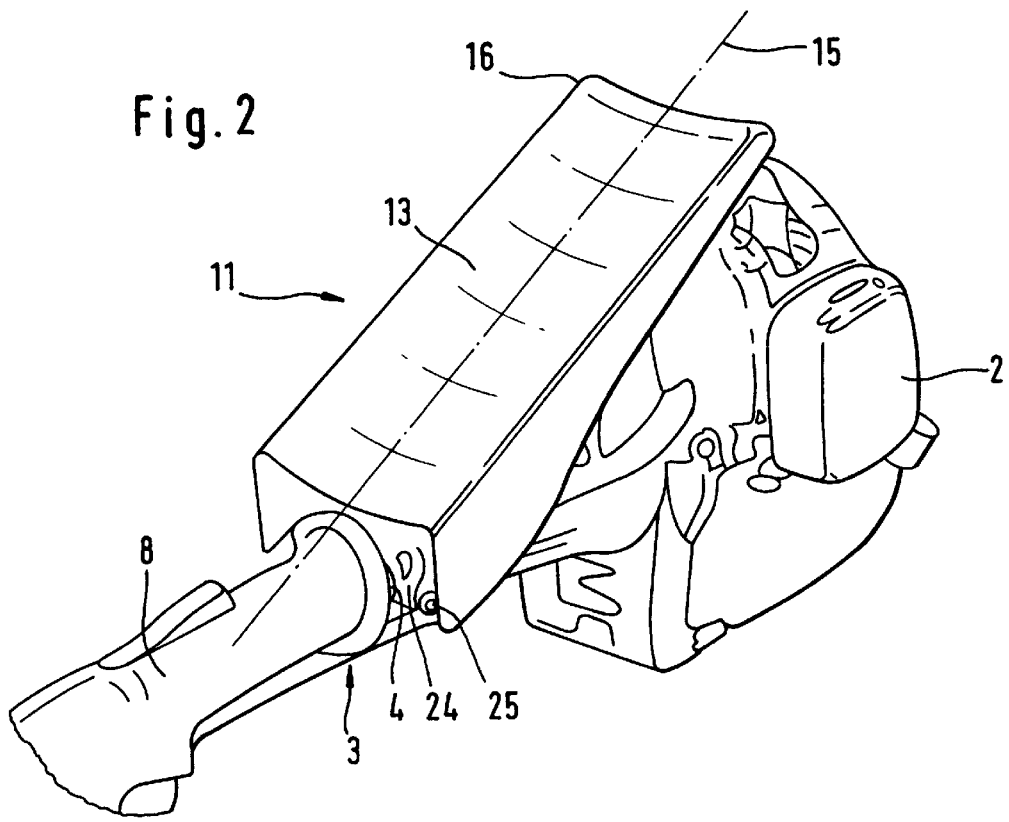
FIG. 2 is a perspective view of a supporting device secured to the carrying tube of a brushcutter.

FIG. 2 shows a perspective view of a supporting device 11 that is fixed in position on the carrying tube 4 of a brushcutter. The supporting device is embodied as a component having an essentially U-shaped cross-sectional configuration, whereby the supporting surface 13, which faces away from the drive motor 2, is concavely curved for the forearm of an operator. The longitudinal axis 15 of the supporting surface 13 extends linearly and intersects the facing end of the first handle 8 at an acute angle. The edges 16 of the supporting surface 13 are rounded. It can also be expedient to pad the supporting surface 13.

The supporting device 11 is held in a clamped manner on the carrying tube 4 by means of the clamping or retaining ring 24 and a screw bolt 25 that extends through. Securing the supporting device 11 in this manner makes it possible to easily adjust the position of the device 11 by rotating or pivoting it about the carrying tube 4.

Figure 3:
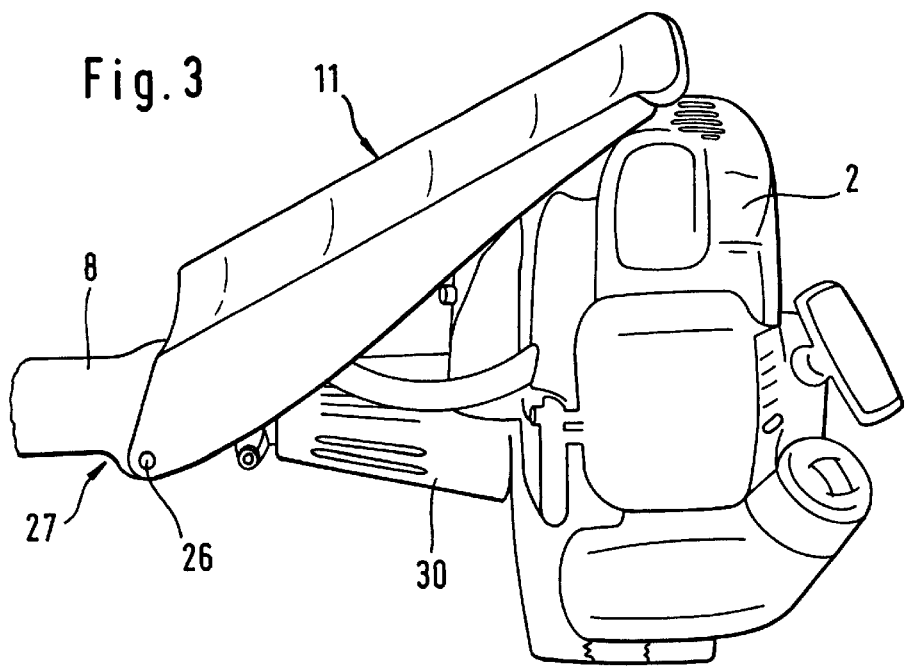
FIG. 3 is a view of a supporting device secured to the first handle of an implement.

FIG. 3 shows a view of a supporting device 11 that is mounted on the first handle 8 of a brushcutter. The supporting device 11 is placed upon that end 27 of the handle 8 that faces the drive motor 2 of the brushcutter, and is clamped securely in place by means of a screw bolt 26 that extends through the handle 8. The supporting device 11 extends extensively entirely over the drive motor 2 to the rear wall of the motor housing and forms a protection against contact for the operator. The supporting device 11 is expediently made as a sheet metal part, or preferably also of a fiber-reenforced plastic.

Figure 4:
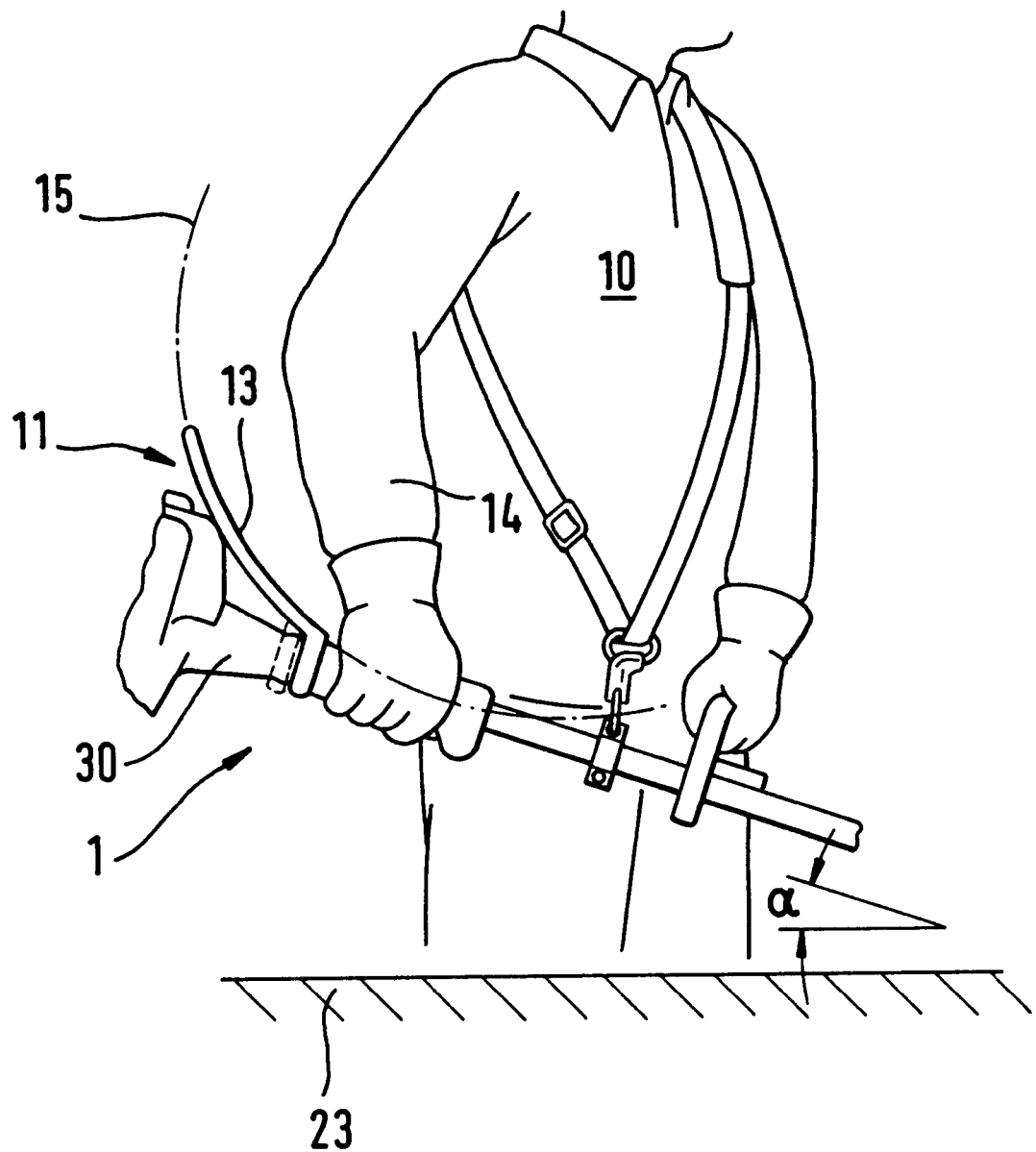
FIG. 4 is a view of a supporting device having a supporting surface that is curved in the direction of its longitudinal axis.

It can be expedient to fix the supporting device in position on the housing of the drive motor 2, for example advantageously at the clutch or connecting housing 30, as indicated in FIG. 4 by dashed lines.

FIG. 4 shows a view of a supporting device 11 having a supporting surface 13 that is curved in the direction of the longitudinal axis 15. Especially for ergonomic reasons, it can be expedient to curve the supporting surface 13 in a direction toward the operator 10. This structural measure causes the forearm 14 to be disposed close to the supporting surface 13 even when the angle α between the carrying tube 4 and the ground 23 is small, in other words when the brushcutter 1 is held in a nearly horizontal position; thus, even in this operating position the supporting surface 13 can serve as an arm support to make it easy to lift and guide the brushcutter. It can also be expedient to make the supporting device 11, and in particular the supporting surface 13 thereof, elastically resilient.

The specification incorporates by reference the disclosure of German priority document 100 03 984.7 of Jan. 29, 2000.

The present invention is, of course, in no way restricted to the specific disclosure of the specification and drawings, but also encompasses any modifications within the scope of the appended claims.

What I claim is:

1. An implement comprising:
   a carrying tube which accommodates a drive shaft;
   a drive motor secured to one end of said carrying tube;
   a cutting tool disposed at the other end of said carrying tube and connected to said drive motor via said drive shaft;
   a first handle disposed in the vicinity of said drive motor and extending in a longitudinal direction of said carrying tube;
   a second handle that extends substantially transverse to said carrying tube and is secured thereto between said first handle and said cutting tool; and
   a supporting device disposed adjacent to said first handle for supporting an arm of an operator, wherein said supporting device is provided with a supporting surface and extends in said longitudinal direction of said carrying tube at least partially in a space between said first handle and said drive motor, and wherein a longitudinal axis of said supporting device forms an angle β of about 35° or less with said carrying tube, wherein said angle is open toward said drive motor.

2. An implement according to claim 1, wherein said supporting surface of said supporting device extends at least partially over said drive motor.

3. An implement according to claim 2, wherein said supporting surface extends entirely over said drive motor.

4. An implement according to claim 2, wherein said supporting device is secured to said first handle.

5. An implement according to claim 2, wherein said supporting device is secured to said carrying tube.

6. An implement according to claim 2, wherein said supporting device is secured to a housing of said drive motor.

7. An implement according to claim 6, wherein said supporting device is secured to a clutch housing of said drive motor.

8. An implement according to claim 2, wherein said supporting surface of said supporting device has a concave cross-sectional configuration.

9. An implement according to claim 2, wherein said supporting device is a component having an essentially U-shaped cross-sectional configuration.

10. An implement according to claim 2, wherein said supporting surface of said supporting device is curved in the direction of said longitudinal axis thereof.

11. An implement according to claim 2, wherein said supporting surface of said supporting device is padded.

12. An implement according to claim 11, wherein edges of said supporting surface are rounded off.

13. An implement according to claim 2, wherein said supporting device is made of polymeric material.

14. An implement according to claim 13, wherein said supporting device is made of fiber-reinforced polymeric material.

15. An implement according to claim 2, wherein said supporting device is secured with a clamp that can be screwed.

16. An implement according to claim 2, wherein said supporting device is secured by means of a plug or snap connection.

17. An implement according to claim 2, wherein a position of said supporting device relative to said carrying tube is adjustable.

* * * * *